(12) United States Patent
Chen et al.

(10) Patent No.: US 7,768,212 B2
(45) Date of Patent: Aug. 3, 2010

(54) LED DRIVER AND CIRCUIT FOR CONTROLLING A POWER SWITCH TO PROVIDE A DRIVING VOLTAGE TO AT LEAST ONE LED

(75) Inventors: Kai-Ji Chen, Tainan County (TW); Ching-Yi Wu, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 333 days.

(21) Appl. No.: 12/103,181

(22) Filed: Apr. 15, 2008

(65) Prior Publication Data
US 2009/0230881 A1 Sep. 17, 2009

(30) Foreign Application Priority Data
Mar. 14, 2008 (TW) .............................. 97109122 A

(51) Int. Cl.
*H05B 37/02* (2006.01)
(52) U.S. Cl. ..................... 315/225; 315/247; 315/291
(58) Field of Classification Search ............. 315/209 R, 315/210, 225, 246, 247, 250, 291, 307, 360
See application file for complete search history.

(56) References Cited

U.S. PATENT DOCUMENTS

| 6,864,641 | B2 * | 3/2005 | Dygert | 315/216 |
| 7,145,295 | B1 * | 12/2006 | Lee et al. | 315/291 |
| 7,535,183 | B2 * | 5/2009 | Gurr | 315/247 |

\* cited by examiner

*Primary Examiner*—Thuy Vinh Tran
(74) *Attorney, Agent, or Firm*—J.C. Patents

(57) ABSTRACT

An LED driver circuit and its control circuit for controlling its power switch are provided. The LED driver includes a switch, a PWM controller, a current source and a signal controller. The switch has a first end outputting a driving voltage to at least one LED. The PWM controller provides a PWM signal. The current source provides a driving current flowing through the LED when a dimming control signal is asserted. The signal controller turns off the switch when the dimming control signal is de-asserted and relays the PWM signal from the PWM controller to the switch so that the switch is controlled by the PWM signal when the dimming control signal is asserted.

18 Claims, 4 Drawing Sheets

LED DRIVER AND CIRCUIT FOR CONTROLLING A POWER SWITCH TO PROVIDE A DRIVING VOLTAGE TO AT LEAST ONE LED

CROSS-REFERENCE TO RELATED APPLICATION

This application claims the priority benefit of Taiwan application serial no. 97109122, filed on Mar. 14, 2008. The entirety the above-mentioned patent application is hereby incorporated by reference herein and made a part of specification.

BACKGROUND OF THE INVENTION

1. Field of the Invention

The present invention relates to a light emitting diode (LED) driver circuit. More particularly, the present invention relates to a circuit for controlling the power switch of an LED driver circuit by pulse width modulation (PWM).

2. Description of the Related Art

FIG. 1 is a schematic diagram showing a conventional LED driver circuit 100. The LED driver 100 consists of a boost DC/DC converter 130 and its load 120. The load 120 includes several strings of LEDs 104 and a current mirror 103 coupled to the LED strings. The boost converter 130 includes an inductor L1, a switch Q1, a PWM controller 101, a diode D1, resistors R11 and R12, and a capacitor C1. The inductor L1 has one end coupled to receive the input voltage Vin1 and the other end coupled to one end of the switch Q1. The anode of the diode D1 is coupled to the same end of the switch Q1. The capacitor C1 has one end coupled to the cathode of the diode D1 and the other end coupled to receive a ground voltage. The PWM controller 101 controls the switch Q1 through the PWM signal PS1. When the switch Q1 is turned on, the current of the inductor L1 increases. When the switch Q1 is turned off, the energy accumulated in the inductor L1 is transferred to the capacitor C1 to maintain a driving voltage Vout1 for the LEDs 104. The resistors R11 and R12 constitute a voltage divider and provide a feedback voltage FB1 to the PWM controller 101. The PWM controller 101 determines the duty cycle of the PWM signal PS1 according to the feedback voltage FB1.

The driving current determines the color of the light emitted from an LED. The brightness of an LED has to be controlled by the duty cycle of its driving current. For example, when the duty cycle is 50%, the brightness is 50% of the maximum level. In the driver circuit 100, the current mirror 103 provides driving current through the LEDs 104 when the dimming control signal DCS1 is asserted and cuts off the driving current when the dimming control signal DCS1 is de-asserted. Therefore the duty cycle of the dimming control signal DCS1 is the duty cycle of the driving current of the LEDs 104.

The switch Q1 is a power metal oxide semiconductor field effect transistor (power MOSFET). Power MOSFET is a large external component. Every time when a power MOSFET is turned on or turned off, it consumes considerable power due to gate charging or discharging. The PWM controller 101 outputs the PWM signal PS1 constantly. The power switch Q1 keeps switching even when the dimming control signal DCS1 is de-asserted, resulting in power waste and low efficiency. This problem is especially severe when the duty cycle of the dimming control signal DCS1 is low. Moreover, this unnecessary switching tends to overcharge the capacitor C1 and enlarge the ripple of the driving voltage Vout1.

SUMMARY OF THE INVENTION

Accordingly, the present invention is directed to an LED driver circuit and a circuit for controlling the power switch of an LED driver circuit. These circuits turn off the power switch to prevent unnecessary switching when the driving current of the LED is cut off. Consequently, these circuits greatly reduce power consumption and achieve higher efficiency. These circuits also features smaller ripple of the driving voltage because there is no capacitor overcharge.

According to an embodiment of the present invention, an LED driver is provided. The LED driver includes a switch, a PWM controller, a current source and a signal controller. The switch has a first end outputting a driving voltage to the LED. The PWM controller provides a PWM signal. The current source provides a driving current flowing through the LED when a dimming control signal is asserted. The signal controller turns off the switch when the dimming control signal is de-asserted and relays the PWM signal from the PWM controller to the switch so that the switch is controlled by the PWM signal when the dimming control signal is asserted.

In an embodiment of the present invention, the LED driver further includes a buffer coupled between the signal controller and the switch.

In an embodiment of the present invention, the LED driver further includes a voltage detector generating a feedback signal indicating the condition of the driving voltage. Moreover, the PWM controller determines the duty cycle of the PWM signal according to the feedback signal.

In an embodiment of the present invention, the PWM controller asserts a fault signal when the feedback signal indicates a fault condition of the driving voltage. The fault condition occurs when the driving voltage is lower than a predetermined threshold. The signal controller relays the PWM signal from the PWM controller to the switch when the fault signal is asserted even if the dimming control signal is de-asserted.

In an embodiment of the present invention, the signal controller includes an OR gate and an AND gate. The OR gate receives the dimming control signal and the fault signal. The AND gate receives the PWM signal and the output signal of the OR gate. The switch is controlled by the output signal of the AND gate.

According to another embodiment of the present invention, a circuit is provided for controlling a power switch to provide a driving voltage to at least one LED. A driving current flowing through the LED is provided when a dimming control signal is asserted. The circuit includes a PWM controller and a signal controller. The PWM controller provides a PWM signal. The signal controller turns off the power switch when the dimming control signal is de-asserted and relays the PWM signal from the PWM controller to the power switch so that the power switch is controlled by the PWM signal when the dimming control signal is asserted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
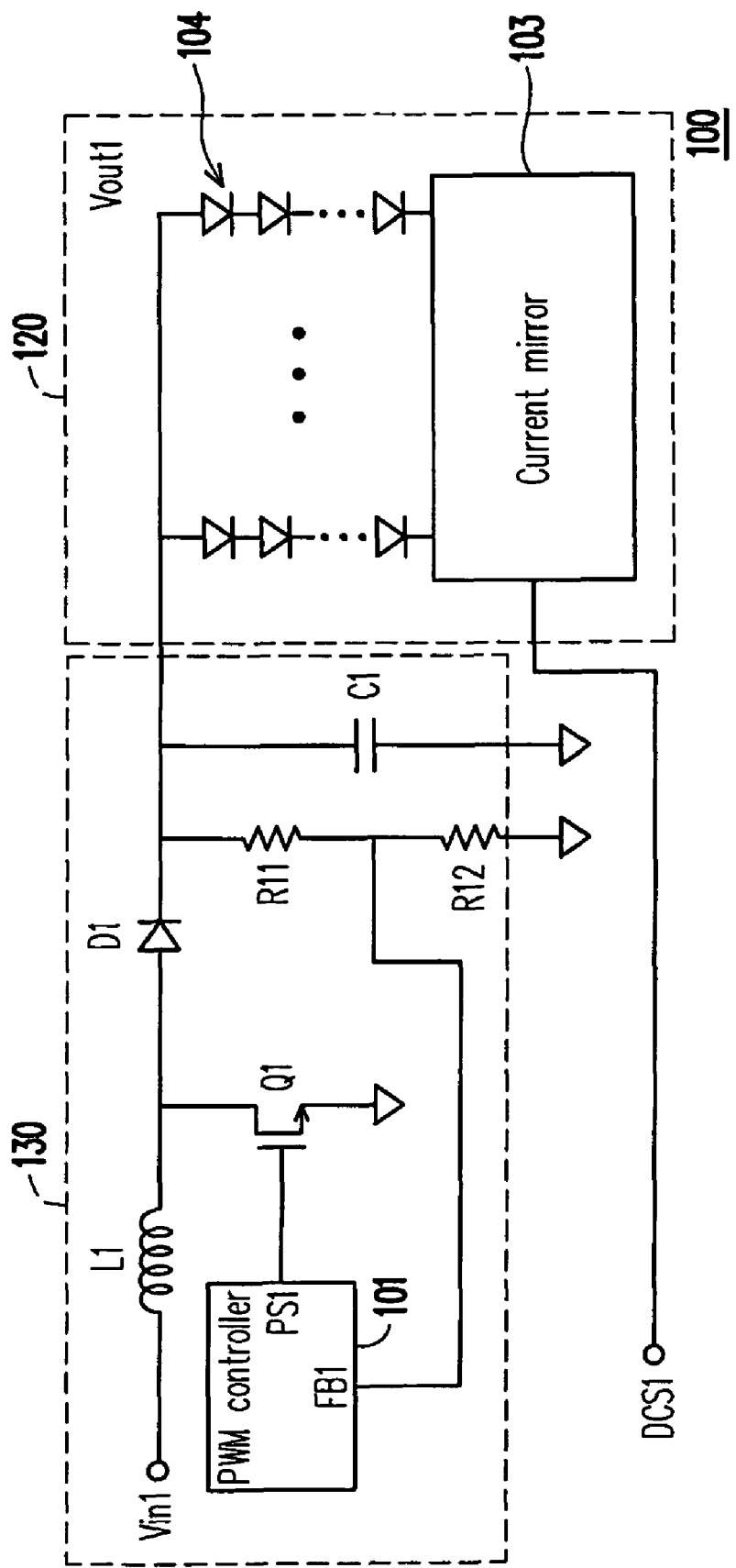
FIG. 1 is a schematic diagram showing a conventional LED driver circuit.

Reference will now be made in detail to the present preferred embodiments of the invention, examples of which are illustrated in the accompanying drawings. Wherever possible, the same reference numbers are used in the drawings and the description to refer to the same or like parts.

Figure 2:
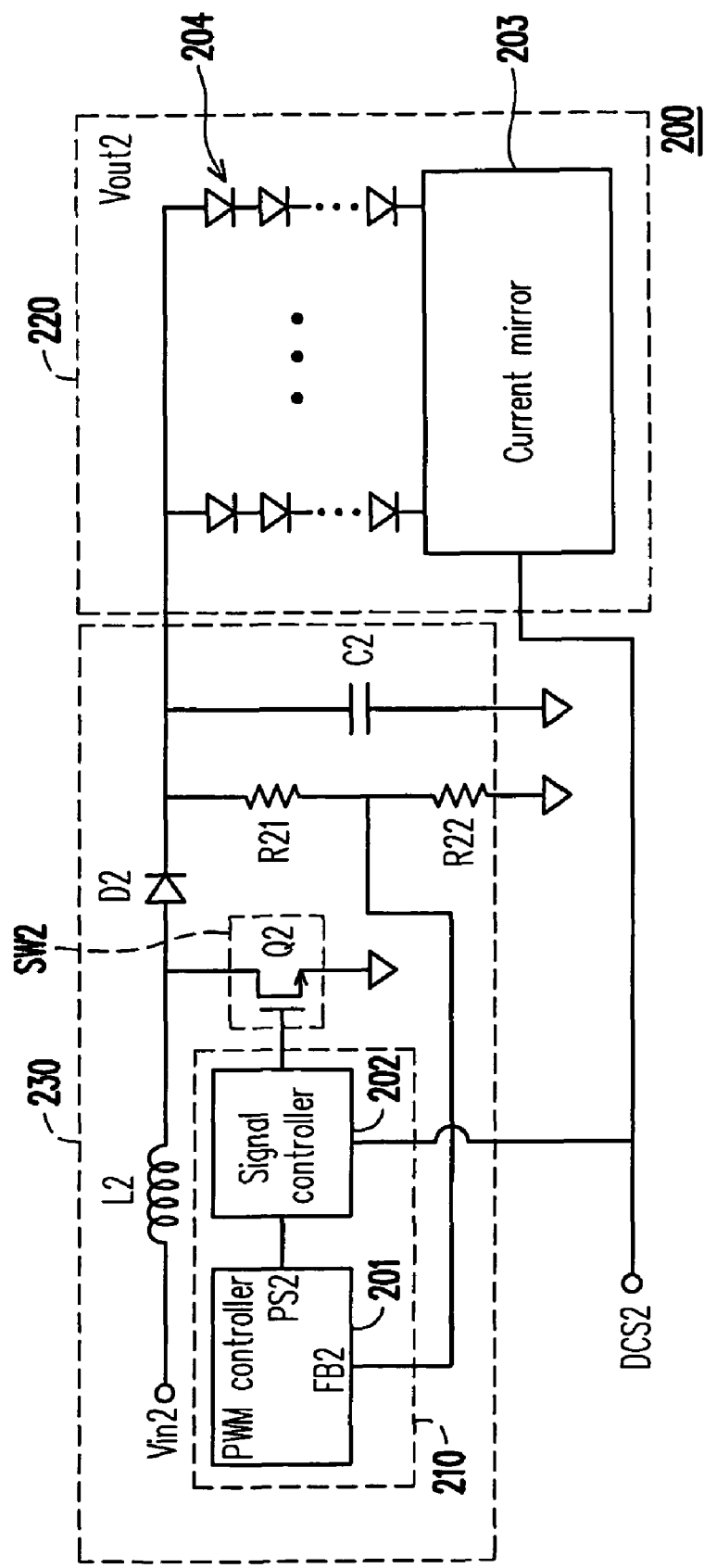
FIG. 2 and FIG. 3 are schematic diagrams showing LED driver circuits according to different embodiments of the present invention.

FIG. 2 is a schematic diagram showing an LED driver circuit 200 according to an embodiment of the present invention. The LED driver 200 is an improvement over the conventional LED driver 100. Briefly speaking, the LED driver circuit 200 turns off the switch SW2 when its switching is unnecessary.

The LED driver 200 drives the LEDs 204 and may be divided into a boost DC/DC converter 230 and its load 220. The load 220 includes the LED strings 204 and a current mirror 203 coupled to the LEDs 204. The current mirror 203 provides driving current flowing through the LEDs 204 when the dimming control signal DCS2 is asserted and cuts off the driving current when the dimming control signal DCS2 is de-asserted. The boost DC/DC converter 230 includes a control circuit 210, a switch SW2, an inductor L2, a diode D2, a capacitor C2, and resistors R21 and R22. The control circuit 210 includes a PWM controller 201 and a signal controller 202. The PWM controller 201 provides a PWM signal PS2. The signal controller 202 turns off the switch SW2 when the dimming control signal DCS2 is de-asserted and relays the PWM signal PS2 from the PWM controller 201 to the switch SW2 so that the switch SW2 is controlled by the PWM signal PS2 and one end of the switch SW2 outputs the driving voltage Vout2 to the LEDs 204 when the dimming control signal DCS2 is asserted. In this way the signal controller 202 prevents unnecessary switching and reduces power consumption by turning off the switch SW2 when the LEDs 204 need not be driven. In this embodiment the switch SW2 is a power MOSFET.

The resistor R21 has one end coupled to receive the driving voltage Vout2. The resistor R22 has one end coupled to the other end of the resistor R21. The other end of the resistor R22 is coupled to receive a ground voltage. The resistors R21 and R22 constitute a voltage detector. This voltage detector generates a feedback signal FB2 indicating the condition of the driving voltage Vout2. The PWM controller 201 determines the duty cycle of the PWM signal PS2 according to the feedback signal FB2.

The other elements of the boost converter 230 are similar to their counterparts in the conventional boost converter 130. In some applications a buffer (not shown) may be coupled between the signal controller 202 and the switch SW2 to enhance the driving capability of the signal controller 202.

Figure 3:
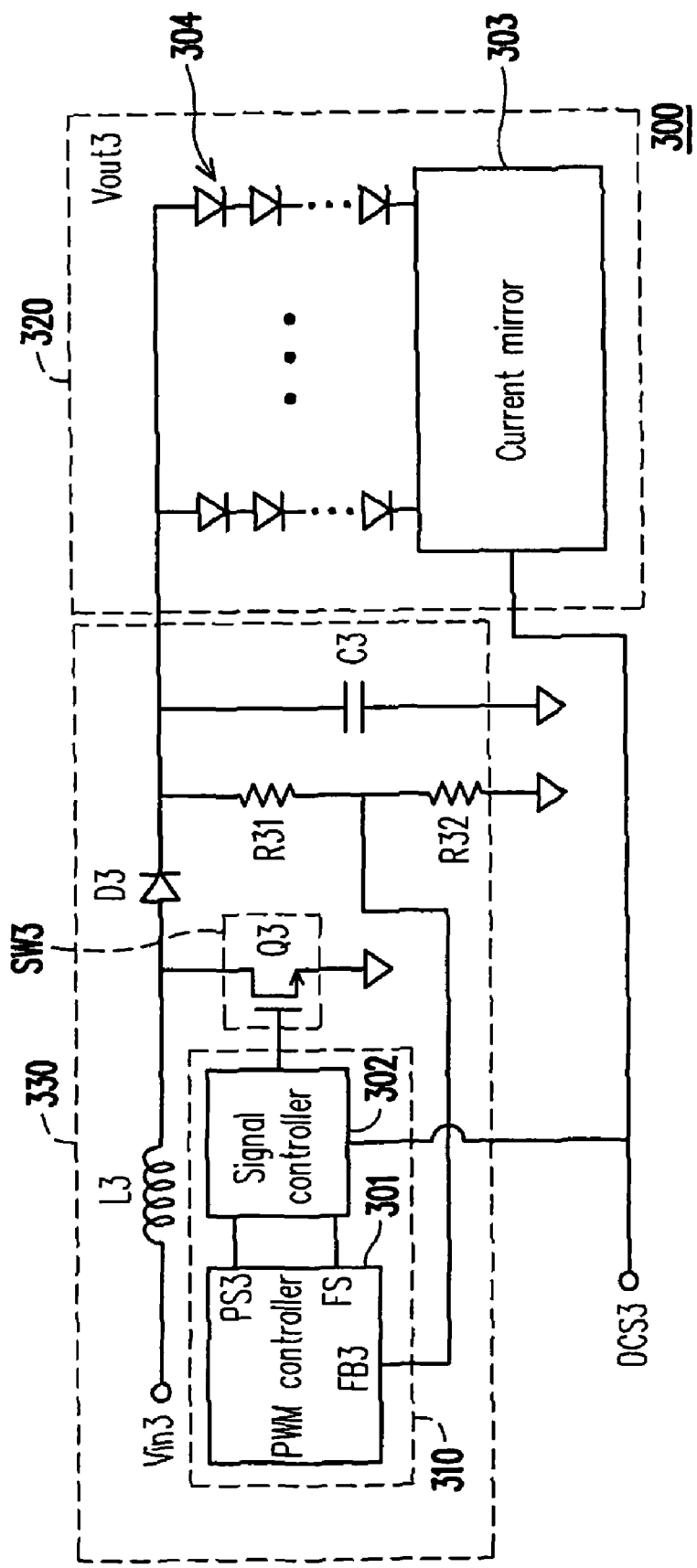

FIG. 3 is a schematic diagram showing an LED driver circuit 300 according to another embodiment of the present invention. The components in the LED driver 300 work in the same way as their counterparts in the LED driver 200 do, except that the PWM controller 301 and the signal controller 302 have some additional functions. The PWM controller 301 asserts a fault signal FS when the feedback signal FB3 indicates a fault condition of the driving voltage Vout3. The feedback signal FB3 is provided by the voltage detector consisting of the resistors R31 and R32. In this embodiment, the fault condition occurs when the driving voltage Vout3 is lower than a predetermined threshold. For example, the threshold may be 90% of the maximum output voltage level. The signal controller 302 relays the PWM signal PS3 from the PWM controller 301 to the switch SW3 when the fault signal FS is asserted even if the dimming control signal DCS3 is de-asserted. When the dimming control signal DCS3 is de-asserted, the LEDs 304 are not driven and no driving current flows through them. However, the driving voltage Vout3 maintained by the capacitor C3 may decrease gradually due to leakage. In this case, the signal controller 302 resumes the operation of the switch SW3 when the driving voltage Vout3 falls below the predetermined threshold to maintain the driving capability of the driving voltage Vout3.

Figure 4:
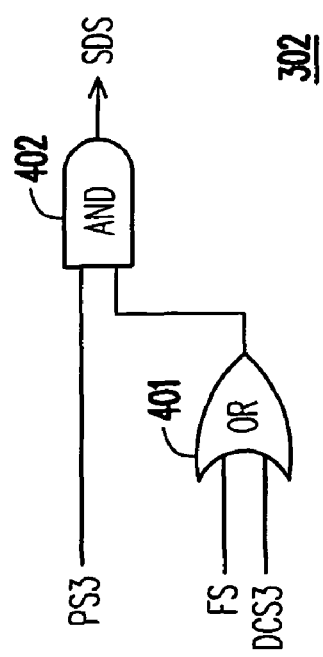
FIG. 4 is a schematic diagram showing the circuit of the signal controller in an embodiment of the present invention.

FIG. 4 is a schematic diagram showing the circuit of the signal controller 302 according to an embodiment of the present invention. The signal controller 302 includes an OR gate 401 and an AND gate 402. The OR gate 401 receives the dimming control signal DCS3 and the fault signal FS. The AND gate 402 receives the PWM signal PS3 and the output signal of the OR gate 401. The switch SW3 is controlled by the output signal SDS of the AND gate 402. It is easily seen that the signal controller 302 relays the PWM signal PS3 to the switch SW3 when either the fault signal FS or the dimming control signal DCS3 is asserted, and the signal controller 302 turns off the switch SW3 when both the fault signal FS and the dimming control signal DCS3 are de-asserted.

Figure 5:
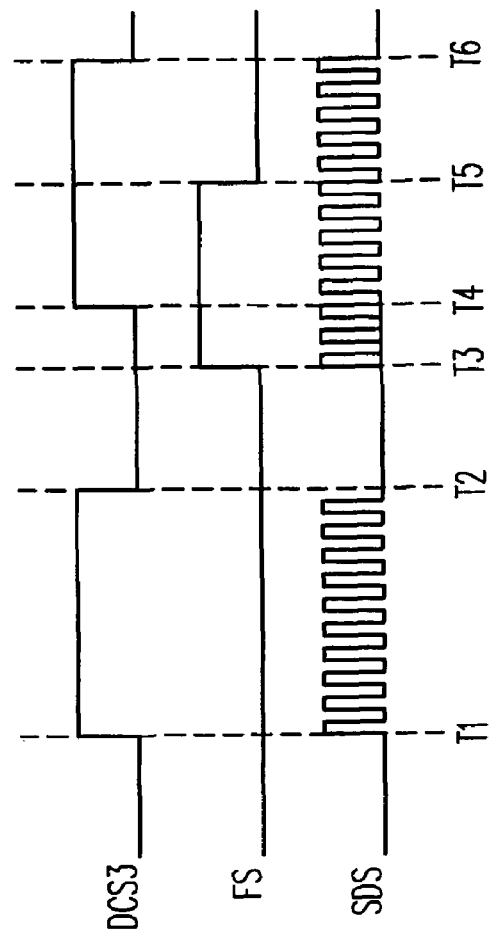
FIG. 5 is a schematic diagram showing signal waveforms in an embodiment of the present invention.

FIG. 5 is a timing chart of important signals in the LED driver circuit 300, which shows a typical operating scenario of the LED driver circuit 300. At time T1, the dimming control signal DCS3 is asserted. The signal controller 302 relays the PWM signal PS3 to the switch SW3. At time T2, the dimming control signal DCS3 is de-asserted. The signal controller 302 suppresses the PWM signal PS3 and turns off the switch SW3. At time T3, the driving voltage Vout3 drops below the threshold and the fault signal FS is asserted. Consequently the signal controller 302 relays the PWM signal PS3 to the switch SW3. At time T4, the dimming control signal DCS3 is asserted. The signal controller 302 keeps relaying the PWM signal PS3. At time T5, the driving voltage Vout3 has risen above the threshold, the fault condition is gone and the fault signal FS is de-asserted. Since the dimming control signal DCS3 is still asserted, the signal controller 302 keeps relaying the PWM signal PS3 to the switch SW3. At time T6, the dimming control signal DCS3 is de-asserted. The signal controller 302 suppresses the PWM signal PS3 and turns off the switch SW3.

In summary, the LED driver circuit in each of the above embodiments includes a control circuit to control the operation of the power switch. The control circuit includes a PWM controller and a signal controller. The control circuit turns off the power switch when there is no need to maintain the driving voltage. Consequently the above embodiments have the advantages of lower power consumption, higher efficiency, preventing capacitor overcharging, and smaller ripple of the driving voltage. The present invention is not confined to LED driver circuits. For example, the control circuit of the present invention is applicable to any PWM converter circuit with a load which can be turned on or turned off in response to an external signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An LED driver for driving at least one LED, comprising:
   a switch having a first end outputting a driving voltage to the at least one LED;
   a pulse width modulation (PWM) controller providing a PWM signal;
   a current source providing a driving current flowing through the at least one LED when a dimming control signal is asserted; and
   a signal controller turning off the switch when the dimming control signal is de-asserted and relaying the PWM signal from the PWM controller to the switch so that the switch is controlled by the PWM signal when the dimming control signal is asserted.

2. The LED driver of claim 1, wherein the switch is a power MOSFET.

3. The LED driver of claim 1 further comprising a buffer coupled between the signal controller and the switch.

4. The LED driver of claim 1, wherein the least one LED comprises a plurality of LEDs are driven by the LED driver and arranged in a plurality of strings.

5. The LED driver of claim 4, wherein the current source is a current mirror coupled to the plurality of strings of LEDs.

6. The LED driver of claim 1 further comprising:
   an inductor having one end coupled to receive an input voltage and the other end coupled to the first end of the switch;
   a diode having an anode coupled to the first end of the switch; and
   a capacitor having one end coupled to a cathode of the diode and the other end coupled to receive a ground voltage.

7. The LED driver of claim 1 further comprising a voltage detector generating a feedback signal indicating a condition of the driving voltage and the PWM controller determines a duty cycle of the PWM signal according to the feedback signal.

8. The LED driver of claim 7, wherein the voltage detector comprises:
   a first resistor having a first end coupled to receive the driving voltage; and
   a second resistor having a first end coupled to the second of the first resistor and a second end coupled to receive a ground voltage.

9. The LED driver of claim 8, wherein the PWM controller asserts a fault signal when the feedback signal indicates a fault condition of the driving voltage.

10. The LED driver of claim 9, wherein the fault condition occurs when the driving voltage is lower than a threshold.

11. The LED driver of claim 9, wherein the signal controller relaying the PWM signal from the PWM controller to the switch when the fault signal is asserted even if the dimming control signal is de-asserted.

12. The LED driver of claim 11, wherein the signal controller comprises:
    an OR gate receiving the dimming control signal and the fault signal; and
    an AND gate receiving the PWM signal and the output signal of the OR gate;
    wherein the switch is controlled by the output signal of the AND gate.

13. A circuit for controlling a power switch to provide a driving voltage to at least one LED, wherein a driving current flowing through the at least one LED is provided when a dimming control signal is asserted, the circuit comprising:
    a pulse width modulation (PWM) controller providing a PWM signal; and
    a signal controller turning off the power switch when the dimming control signal is de-asserted and relaying the PWM signal from the PWM controller to the power switch so that the power switch is controlled by the PWM signal when the dimming control signal is asserted.

14. The circuit of claim 13, wherein the PWM controller determines a duty cycle of the PWM signal according to a feedback signal indicating a condition of the driving voltage.

15. The circuit of claim 14, wherein the PWM controller asserts a fault signal when the feedback signal indicates a fault condition of the driving voltage.

16. The circuit of claim 15, wherein the fault condition occurs when the driving voltage is lower than a threshold.

17. The circuit of claim 16, wherein the signal controller relaying the PWM signal from the PWM controller to the switch when the fault signal is asserted even if the dimming control signal is de-asserted.

18. The circuit of claim 17, wherein the signal controller comprises:
    an OR gate receiving the dimming control signal and the fault signal; and
    an AND gate receiving the PWM signal and the output signal of the OR gate;
    wherein the switch is controlled by the output signal of the AND gate.

* * * * *